(12) United States Patent  
Bush et al.

(10) Patent No.: US 8,803,737 B2
(45) Date of Patent: Aug. 12, 2014

(54) LOCATION DETERMINATION

(75) Inventors: Jeffrey Alan Bush, San Jose, CA (US); Ronald Keryuan Huang, Milpitas, CA (US); Daryl Mun-Kid Low, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 646 days.

(21) Appl. No.: 12/040,283

(22) Filed: Feb. 29, 2008

(65) Prior Publication Data

US 2009/0219209 A1 Sep. 3, 2009

(51) Int. Cl.
*G01S 3/02* (2006.01)

(52) U.S. Cl.
USPC .......................................................... 342/450

(58) Field of Classification Search
CPC ....................................................... G01S 3/02
USPC ............ 342/450, 463, 357.2, 357.25, 357.31, 342/357.74, 357.77; 701/207, 213
See application file for complete search history.

(56) References Cited

U.S. PATENT DOCUMENTS

| | | | |
|---|---|---|---|
| 5,463,725 A | 10/1995 | Henckel et al. | |
| 6,662,016 B1 | 12/2003 | Buckham et al. | |
| 6,732,047 B1 | 5/2004 | De Silva | |
| 6,865,395 B2 | 3/2005 | Riley | |
| 6,978,206 B1 | 12/2005 | Pu et al. | |
| 7,683,893 B2 | 3/2010 | Kim | |
| 7,840,347 B2 | 11/2010 | Noguchi | |
| 2002/0145557 A1 | 10/2002 | Roy et al. | |
| 2003/0120423 A1 | 6/2003 | Cochlovius et al. | |
| 2004/0021566 A1 | 2/2004 | Hayashi et al. | |
| 2005/0267676 A1 | 12/2005 | Nezu et al. | |
| 2006/0206264 A1 | 9/2006 | Rasmussen | |
| 2006/0268795 A1 | 11/2006 | Tamaki | |
| 2007/0106466 A1 | 5/2007 | Noguchi | |
| 2007/0109323 A1 | 5/2007 | Nakashima | |
| 2007/0146342 A1 | 6/2007 | Medler et al. | |
| 2007/0150444 A1 | 6/2007 | Chesnais et al. | |
| 2007/0162224 A1 | 7/2007 | Luo | |
| 2008/0045138 A1 | 2/2008 | Milic-Frayling et al. | |
| 2009/0112465 A1 | 4/2009 | Weiss et al. | |
| 2009/0143076 A1* | 6/2009 | Wachter et al. ............ | 455/456.1 |

FOREIGN PATENT DOCUMENTS

| | | |
|---|---|---|
| EP | 0 633 452 | 1/1995 |
| EP | 0 762 362 | 3/1997 |
| EP | 0 917 385 A1 | 5/1999 |
| EP | 1 251 362 | 10/2002 |
| EP | 1 445 970 | 8/2004 |
| EP | 1 672 474 | 6/2006 |
| EP | 1 768 280 A1 | 3/2007 |

(Continued)

OTHER PUBLICATIONS

Authorized Officer Jacqueline Pitard, European Patent Office, International Search Report and the Written Opinion of the International Searching Authority, dated Dec. 9, 2009, 28 pages.

(Continued)

*Primary Examiner* — Harry Liu
(74) *Attorney, Agent, or Firm* — Fish & Richardson P.C.

(57) ABSTRACT

Among other disclosed subject matter, a method includes detecting that a location is to be determined. The method includes selecting at least one among multiple location determination techniques based on a selection criterion. The method includes causing the location to be determined using the selected location determination technique.

15 Claims, 6 Drawing Sheets

(56) References Cited

FOREIGN PATENT DOCUMENTS

| EP | 1 975 567 | 10/2008 |
|----|-----------|---------|
| WO | WO 02/03093 A1 | 1/2002 |
| WO | 02/33533 | 4/2002 |
| WO | 03/005750 A1 | 1/2003 |
| WO | 2004/034194 | 4/2004 |
| WO | WO 2006/096923 A1 | 9/2006 |
| WO | 2008/025013 A2 | 2/2008 |
| WO | 2009/002942 | 12/2008 |

OTHER PUBLICATIONS

"Notification of Transmittal of International Search Report and the Written Opinion of the International Searching Authority" mailed Jun. 16, 2009; International appln No. PCT/US2009/040573, filed Apr. 14, 2009.

European Authorized Officer Marie Ghilini, Invitation to Pay Additional Fees and, Where Applicable, Protest Fee for Application No. PCT/US2009/033110, filed Apr. 2, 2009, 10 pages.

Singh, R., et al., "Location Determination using WLAN in Conjunction with GPS Network (Global Positioning System)," Vehicular Technology Conference, 2004. VTC 2004-Spring. 2004 IEEE 59$^{th}$ Milan, Italy, May 17-19, 2004, Piscataway, NJ USA, IEEE, US, vol. 5, May 17, 2004, pp. 2695-2699, XP010766738.

Partial European Search Report dated Jan. 2, 2012, European Application No. 09005365.3, 5 pages.

GPSMap60 owner's manual, GPS Navigation, Garmin Ltd., Mar. 31, 2006, p. 8-9.

* cited by examiner

LOCATION DETERMINATION

BACKGROUND

This specification is related generally to location determination.

The increased importance of processor-based devices has made navigation services and other forms of location determination available to a substantial number of users. For example, online services are now available that can provide maps, directions, navigation information and other information relating to the geography of places on Earth and also in the sky.

Some devices are intended for portable use and are therefore sometimes referred to as mobile. Some of them rely on a form of radio communication to connect to a home station, a network or some other base, with which information can be exchanged. With some mobile devices the range of radio signal coverage is substantial and the users can therefore operate the device anywhere in a significant geographic area. This ability to move around with the device also increases the need to determine the location of the device, to a more or less exact geographic position. Some technologies have been introduced in this regard, including Global Positioning System (GPS) and other approaches that use signals from transmitters on the ground.

SUMMARY

The present invention relates to location determination.

In a first aspect, a method includes detecting that a location is to be determined. The method includes selecting at least one among multiple location determination techniques based on a selection criterion. The method includes causing the location to be determined using the selected location determination technique Implementations can include any, all or none of the following features. The selection can be performed in a process on a mobile device that acts as a server for multiple applications on the mobile device. The process can determine the location using the selected location determination technique, and the method can further include providing the determined location from the process to at least one of the multiple applications identified in the detection. The process can be included in an aggregator in the mobile device that aggregates the multiple location determination techniques. The method can further include identifying the selected location determining technique to at least one of the multiple applications identified in the detection; wherein the at least one application determines the location using the selected location determination technique. At least one of the multiple location determination techniques can be configured to determine the location using power information indicating a detected power of respective signals received in a mobile device from multiple transmitters, and a formula that depends on locations of the multiple transmitters. At least one of the multiple location determination techniques can be configured to determine the location using transmitter identifying information received in a mobile device from multiple transmitters, and locations of the multiple transmitters. At least one of the multiple location determination techniques is configured to determine the location using GPS. The selection criterion can include that a mobile device for which the location is to be determined is in a predetermined state. The selection criterion can include an amount of power available in a mobile device for which the location is to be determined. An application in a mobile device for which the location is to be determined can be identified in the detection and the selection criterion can include a need of the application. The selection criterion can include an availability of at least one of the multiple location determination techniques. The selection criterion can include a prioritization defined among the multiple location determination techniques. The selection criterion can include an accuracy of at least one of the multiple location determination techniques. The selection criterion can include a cost of using at least one of the multiple location determination techniques.

In a second aspect, a computer program product, encoded on a tangible program carrier, is operable to cause a portable device to perform operations including: detecting that a location is to be determined; selecting at least one among multiple location determination techniques based on a selection criterion; and causing the location to be determined using the selected location determination technique.

In a third aspect, a mobile device includes an application layer for multiple applications configured to use information indicating a location where the mobile device is determined to be located. The mobile device includes a services layer including a service to select at least one among multiple location determination techniques for use in determining the location.

Implementations can include any, all or none of the following features. The service can include a daemon that aggregates location determination techniques. The mobile device can further include a framework layer between the applications layer and the services layer, the framework layer including a client library to which at least one of the multiple applications in the applications layer can bind. The client library can provide a location API and handle communication with the service. The mobile device can further include a display to present a map; and an input device for a user to request the location to be determined; wherein, in response to a user input, there is placed on the map a first indicator corresponding to the determined location and a second indicator of a determined uncertainty of the determined location.

In a fourth aspect, a method includes detecting that a determination of a location is to be performed. The method includes performing a portion of the determination on a device. The method includes causing a remainder of the determination to be performed on another device. The method includes receiving, in the device and from the other device, a result of performing the remainder of the determination.

Implementations can include any, all or none of the following features. The method can further include receiving transmitter identifying information in the device from multiple transmitters, and obtaining locations of the multiple transmitters stored on the device using the transmitter identifying information; wherein the location is determined in part using the obtained locations of the multiple transmitters. The portion of the determination can be performed in a services layer of the device that includes a service to select at least one among multiple location determination techniques for use in determining the location. The method can further include forwarding the determined location to an application layer in the device for multiple applications configured to use information indicating determined locations of the device. Causing a remainder of the determination to be performed on another device can include a load balancing of computations between the device and the other device. The method can further include selecting an amount of the load balancing based on a present characteristic. The present characteristic can include at least one of: a processor capacity of the device, an available memory, a current processing load, a deadline for determining the location, a need for accuracy in the determined location, and combinations thereof.

In a fifth aspect, a computer program product, encoded on a tangible program carrier, is operable to cause a portable device to perform operations comprising: detecting that a determination of a location of a device is to be performed; performing a portion of the determination on the device; causing a remainder of the determination to be performed on another device; and receiving, in the device and from the other device, a result of performing the remainder of the determination.

Particular embodiments of the subject matter described in this specification can be implemented to realize one or more of the following advantages. Improved location determination can be provided. More efficient use of location determination techniques can be provided. Location determine techniques can be selected based on relevant information. Multiple location determination techniques can be aggregated in a device. Relevant information and/or a determined location can be served from a server within a mobile device to one or more applications in the device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
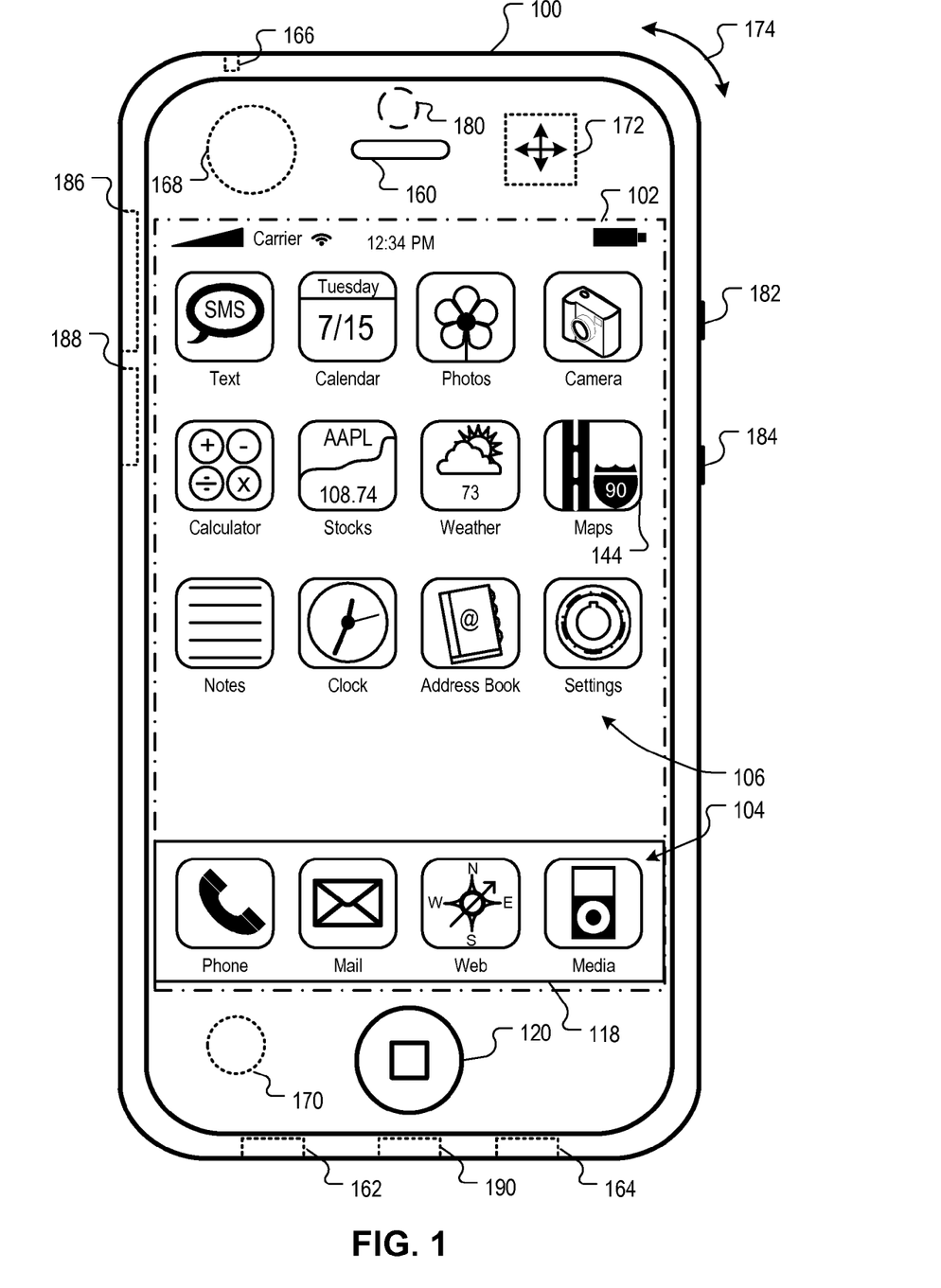
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices. Below will be described examples of determining the location of a device such as the mobile device 100. For example, at least one among multiple location determination techniques can be selected for determining the location.

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

In some implementations, the mobile device 100 can implement multiple device functionalities, such as a telephony device, an e-mail device, a network data communication device, a Wi-Fi base station device (not shown), and a media processing device. In some implementations, particular display objects 104 can be displayed in a menu bar 118. In some implementations, device functionalities can be accessed from a top-level graphical user interface, such as the graphical user interface illustrated in FIG. 1. Touching one of the objects 104 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching a phone object, the graphical user interface of the touch-sensitive display 102 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object, a calendar object, a photos object, a camera object, a calculator object, a stocks object, a weather object, a maps object 144, a notes object, a clock object, an address book object, and a settings object. Touching the maps object 144 can, for example, invoke a mapping and location-based services environment and supporting functionality; likewise, a selection of any of the display objects 106 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Figure 2:
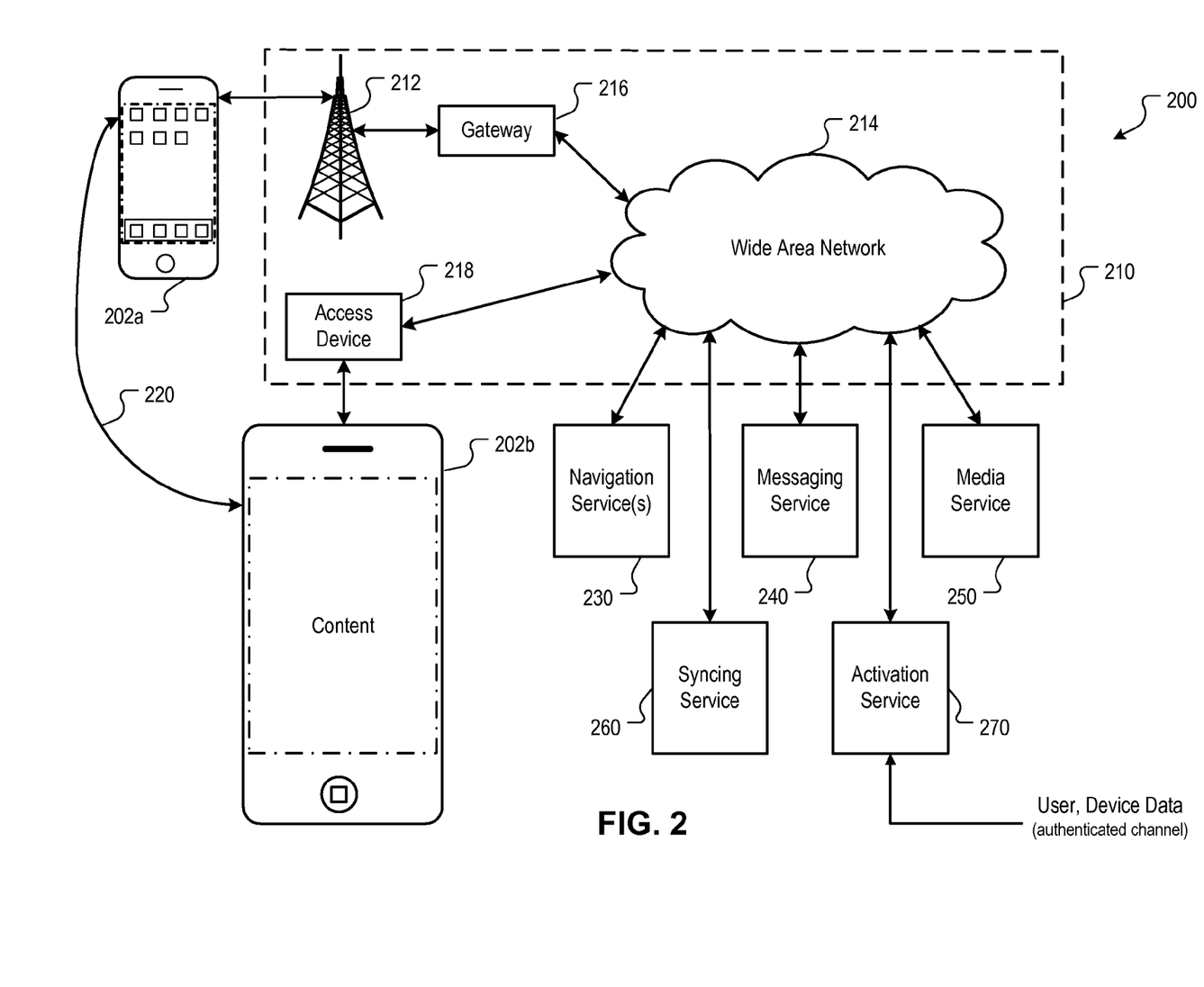
FIG. 2 is a block diagram of an example network operating environment for the mobile device of FIG. 1.

FIG. 2 is a block diagram of an example network operating environment 200. In FIG. 2, mobile devices 202a and 202b each can represent mobile device 100. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIG. 1. Other communication protocols and topologies can also be implemented.

The mobile device 202a or 202b can, for example, communicate with one or more services 230, 240, 250, 260, and 270 over the one or more wired and/or wireless networks 210. For example, one or more navigation services 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1, and can request and receive a map for a particular location, request and receive route directions, or request and receive listings of businesses in the vicinity of a particular location, for example.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching, for example, a Web object.

Figure 3:
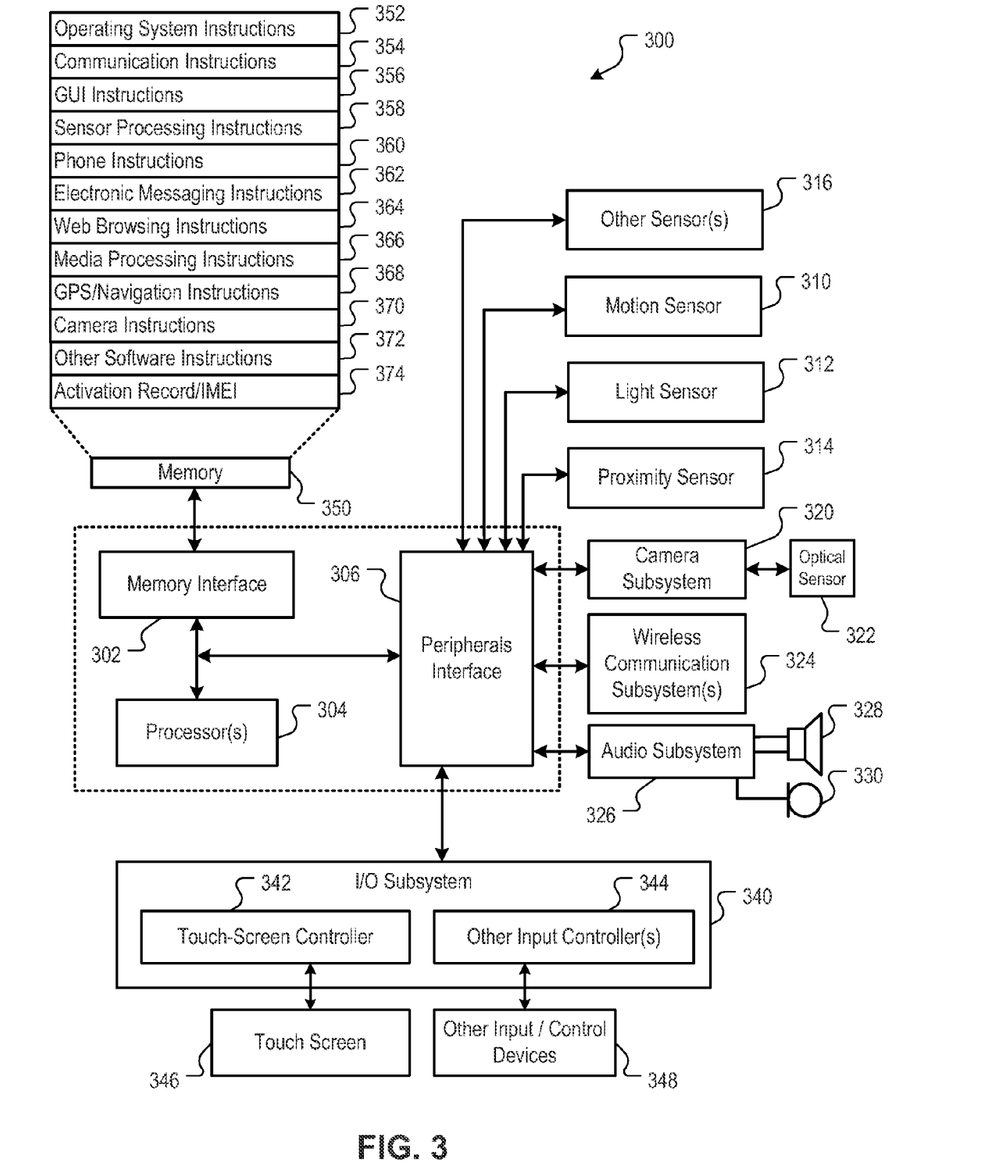
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect that contact and/or movement begins or ends using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions. In some implementations, some or all of the instruction 368 can be executed to cause a location of the mobile device 100 to be determined, for example by selecting a location determination technique to be used. The instructions 358 can be configured so that also one or more, or all, of the other instructions in the memory 350 can be used in performing a function. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 may be implemented in hardware and/or in software, including in one or more signal processing and/or application specific integrated circuits.

Figure 4:
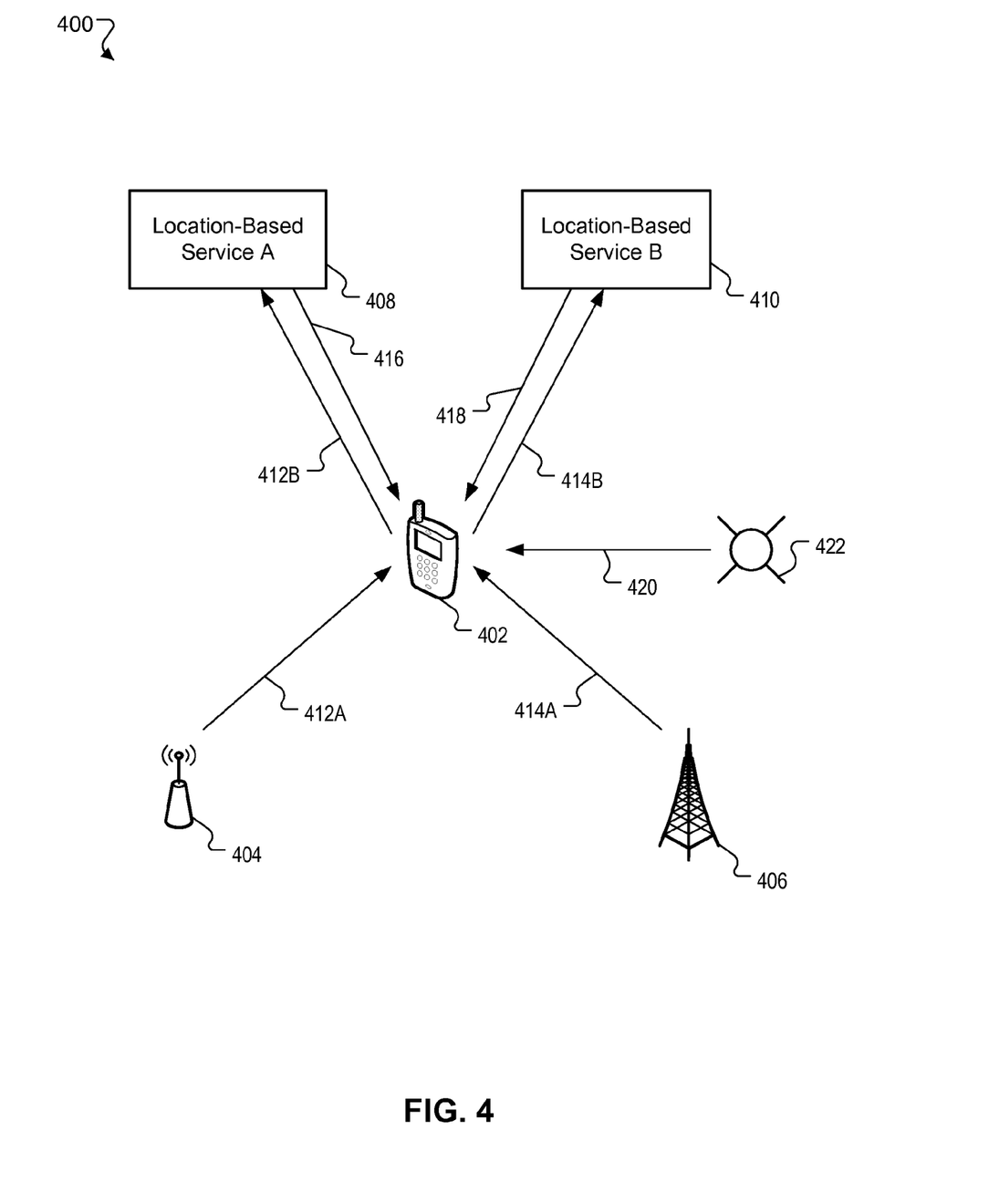
FIG. 4 illustrates an example implementation of a navigation system.

FIG. 4 illustrates an example implementation of a navigation system 400. In FIG. 4, mobile device 402 can represent mobile device 100. The mobile device 402 can, for example, communicate to one or more network access points 404 (e.g., Wi-Fi base station devices) or one or more cell towers 406. In some implementations, the access points 404 can be any combination of 802.11b/g wireless routers, 802.11n wireless routers, and some other Wi-Fi devices that implement any suitable Wi-Fi or other wireless networking technology or protocol. Using the communication with the access points 404 or the cell towers 406, a location-based service 408 (Location-Based Service A) or a location-based service 410 (Location-Based Service B) can estimate geographic areas where the mobile device 402 is currently located. The actual location of the mobile device 402 can be anywhere within the estimated geographic area. An estimated geographic area is not necessarily circular but can be indicated as a circular area on a map display for convenience.

The mobile device 402 can, for example, receive a communication 412A from an access point 404 (e.g., a Wi-Fi access point). The communication 412A can include information about the access point 404, e.g., the Internet Protocol (IP) address and/or the Media Access Control (MAC) address of the access point 404. The communication 412A can include other information, such as the latitude and longitude of the access point 404. The information received in communication 412A can be sent to the location-based service 408 in communication 412B. The location-based service 408 can, for example, with a degree of uncertainty or error, estimate a first geographic area in which the mobile device 402 is currently located using the information sent in communication 412B. In some implementations, the location-based service 408 is a system or service that estimates, with some degree of uncertainty or error, the position of a device using a database of access points mapped to geographic locations. The accuracy or precision (or the degree of uncertainty or error) of the estimated position can, for example, be based on the range of the technology, the accuracy of the range, or some other metric. Accuracy or precision of an estimated position can be affected by one or more factors including, for example, inherent properties or limitations of the technology or system, and a level of deployment of the given technology or system (e.g., number of access points or cell towers in the vicinity of the device). In some implementations, part or all of the functionality of the location-based service 408 can be performed in and/or by the mobile device 402. For example, the mobile device 402 in some implementations can estimate its location based on signal from one or more of the access point 404.

In some implementations, the accuracy or precision of the estimated position is stated in units of distance (e.g., "the estimated position is accurate up to 50 meters"). That is, the actual position of the mobile device 402 can be within the accuracy distance from the estimated position. For example, the first geographic area can be a circle centered at the latitude and longitude of the estimated position with a radius equal to the stated accuracy or precision (e.g. 38 meters if the accuracy of the estimated position is up to 38 meters). The first geographic area can alternatively be represented on a map display as a square, rectangle, oval, diamond, triangle, or some other shaped enclosed region.

In some other implementations, unique signatures of multiple access points (e.g. five or more) can be compared to a local cache on the mobile device 402 or a central reference database at location-based service 408 via network communication (e.g. communication 412B can be sent to the location-based service 408). The location-based service 408 can use the unique signatures to estimate the latitude and longitude of the center of the first geographic circle with an m meter radius (e.g., about 20 meters).

In some implementations, location-based service 408 includes positioning services and reference database information provided by SKYHOOK WIRELESS of Boston, Mass.

The mobile device 402 can receive a communication 414A from cell tower 406. The cell communication 414A can include, for example, information identifying the cell tower 406. In some implementations, the cell communication 414A can also include the latitude and longitude of the cell tower 406. The identifying information and/or the latitude and longitude of the cell tower 406 can be sent to the location-based service 410 in communication 414B. The location-based service 410 can estimate a position of the mobile device 402 using the information included in communication 414B and estimate an accuracy of the estimate position. Thus, for example, the location-based service 410 can estimate a second geographic area in which the mobile device 402 is currently located. In some implementations, the second geographic area is represented on a map as a circular region centered at the estimated position and with a radius equal to the accuracy of the estimated position. In some other implementations, the second geographic area can represented on a map by a square or rectangular shaped enclosed region, to name a few additional examples. In some implementations, part or all of the functionality of the location-based service 410 can be performed in and/or by the mobile device 402. For example, the mobile device 402 in some implementations can estimate its location based on signal from one or more of the cell tower 406.

In some implementations, the position and the geographic area of the mobile device 402 can be estimated using a "cell of origin" positioning technology. In some other implementations, for example as will be described below, the second geographic area can be determined by cell tower triangulation.

In some implementations, the mobile device 402 can receive one or more communications 420 from a remote transmitter 422, such as a satellite. In this example, the satellite 422 transmits the communication 420 to facilitate GPS navigation by devices that are compatible with this technology. For example, the mobile device 402 can have a GPS receiver configured to receive and interpret signals from any of several GPS satellites. Based on such signals, the mobile device 402 can make a GPS-aided location determination. In some implementations, the location determination based on information from the transmitter 422 can be performed other than by the mobile device 402, such as by one or more of the services 408 and 410.

In implementations where at least a portion of a location determination is performed remotely from the mobile device 402, the first and/or second geographic areas can be sent to the mobile device 402 by one or more of communications 416 and 418, respectively. The mobile device 402 can present, on the touch-sensitive display 102 for example, a map view including an indication of one or more geographic areas.

The location-based service 408 and location-based service 410 can run on the same device or on separate devices. For example, the location-based services 408 and 410 can run on servers communicating with the mobile device 100 through a network (e.g., WAN 214). The servers can be separate servers or the same server. The location-based services 408 and 410 can alternatively run on the mobile device 402.

The mobile device 402 can, for example, connect to additional devices or services (not shown) for location-based services, instead of, or in addition to the access point 404 and the cell tower 406. Such devices or services could include a Bluetooth™ device, GPS, radio or TV towers, or cellular grids, to name a few examples. For example, the mobile device 402 can connect to peer devices with the Bluetooth™ communication device 188 (FIG. 1) and receive location-based information from other mobile devices and/or Bluetooth™ enabled devices. In some implementations, the mobile device 402 can determine or estimate its position and/or geographic area using other technologies (e.g., GPS). In some implementations, the geographic area determined or estimated using any of these other technologies can be used (e.g., displayed) in lieu of the geographic area estimated using location-based services 408 or 410 (e.g., Wi-Fi or cellular positioning techniques) if the geographic area determined or estimated using the other technologies is contained entirely within the geographic area estimated using location-based services 408 or 410 and if the other technologies are more accurate or precise according to the priority table stored in the mobile device 402.

Figure 5:
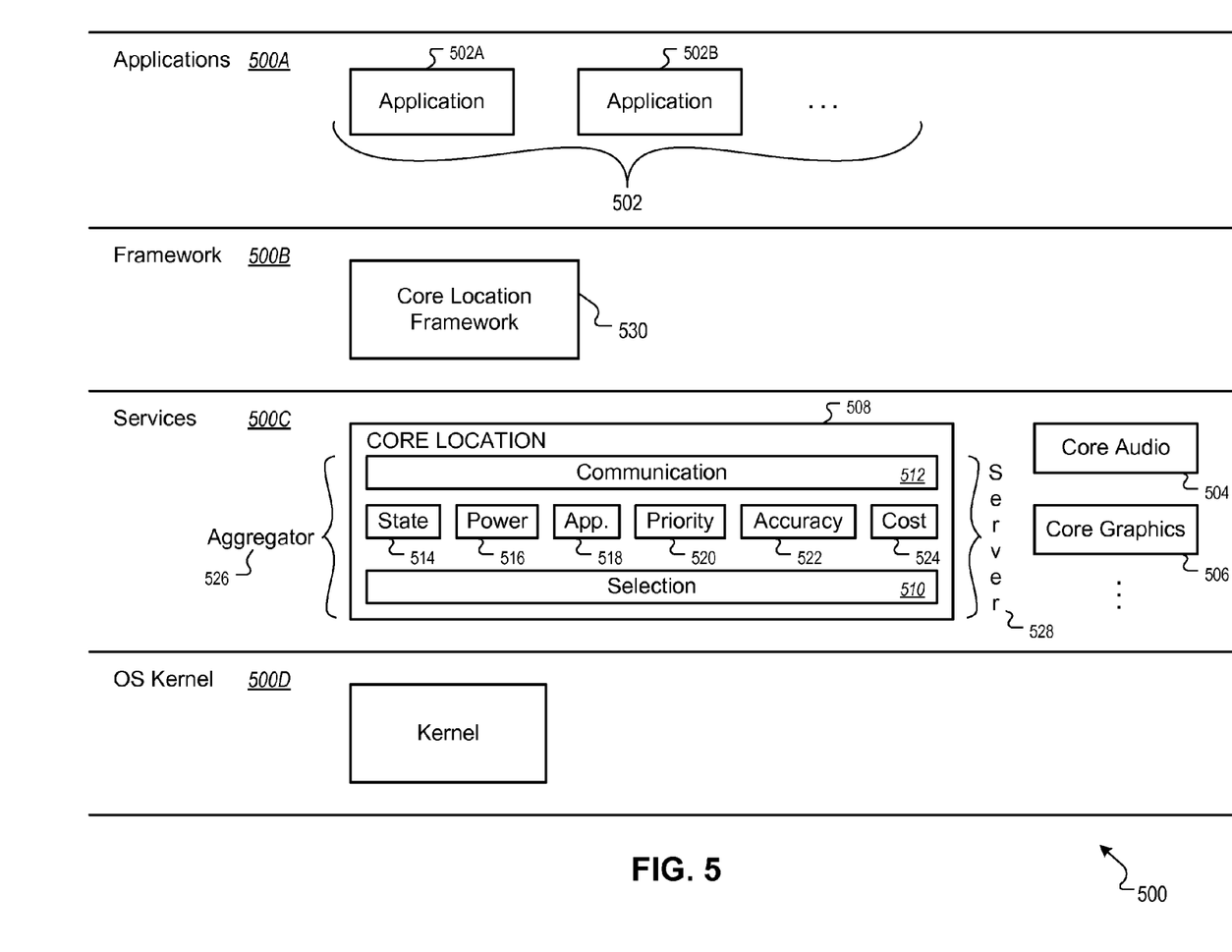
FIG. 5 illustrates an example implementation of layers in a mobile device.

FIG. 5 illustrates an example implementation of layers 500 in a mobile device. In some implementations, any or all of the mobile device 100, 202a or 202b, 300 and 402 can include the layers 500. For example, any or all of the layers 500 can be included in a software stack and/or a protocol stack of a device.

In this example, the layers 500 comprise: an applications layer 500A, a framework layer 500B, a services layer 500C, and an operating system (OS) kernel layer 500D. For example, a stack used in products or services available from Apple Inc., such as in the Mac OS X, can be modified to provide the layers 500.

The applications layer 500A can include one or more applications 502. For example, the application 502A can be a map application that is configured to provide navigational assistance to a user, such as by presenting a map portion on a display to indicate to the user the exact position where the device, and therefore the user, is presently located. The application 502B, as another example, can be an application configured to use a rough estimate of the device's position for one or more purposes, such as to launch specific services and/or to present related advertisements. That is, in the example described, both of the applications 502A and 502B can use the location of the device to perform a function, and here the application 502B may not need as much specificity and/or reliability, relatively speaking, in the position determination as may the application 502A.

The application(s) can cooperate with any or all other portions of the device in their operation. For example, the framework layer 500B can provide a framework that allows the application(s) 502 to operate, such as by providing common definitions, definitions of data structures and/or portal features. As another example, the framework layer 500B can provide a way for the application(s) 502 to interact with the services layer 500C.

The services layer 500C can provide one or more services that can be made available for use in the device. For example, the services layer 500C in this implementation includes a Core Audio service 504, a Core Graphics service 506 and a Core Location service 508. In some implementations, one or more of the services 504-508 can be included in an application development kit where a developer can refer to the service(s) for implementation in a particular application. For these and other purposes, the service(s) 504-508 can include drivers, control routines and useful definitions that facilitate such implementation(s). For example, the developer can use the Core Audio service 504 to provide audio features to an application and/or use the Core Graphics service 506 to provide graphics features.

The Core Location service 508, in this implementation, can provide service relating to determining a location of the device for which it is being used. In some implementations, the service 508 can include a selection module 510 configured to select at least one among multiple location determination techniques. For example, the module 510 can select the location determination technique(s) based on one or more selection criteria. Examples of selection criteria will be described below. In some implementations, the choice can be between any of the techniques described with reference to FIG. 4. Other techniques can be used and/or considered by the module 510.

The service 508 can communicate with one or more entities in the device. For example, the service 508 can detect that one of the application 502 needs the device location to be determined, and can provide a suitable response. In some implementations, the service 508 initiates the location determination by the selected technique and provides the determined location to the requesting application(s). In some implementations, the service 508 selects the technique to be used and identifies it to the requesting application(s) so that the technique can be initiated.

In some implementations, a state component 514 can be used in selecting at least one location determination technique. For example, the state component 514 can identify a predetermined state to the selection module 510. The Core Location service 508 can determine whether the device is currently in the predetermined state identified by the state component 514. If the result is yes, the selection module can select any or all of the location determination techniques that is associated with the predetermined state. For example, if the device is in a state restricted to "wifi communication only", the selection module 510 can choose a location determination technique associated with the location based service 408 (FIG. 4). As another example, if the state indicates that GPS is the only available technique, the selection module can use this information in its selection.

In some implementations, a power component 516 can be used in selecting at least one location determination technique. For example, the power component 516 can identify a presently available amount of power to the selection module 510. The selection module 510 can select any or all of the location determination techniques that is associated with the amount of power available in the device. For example, if the device is low on power, the selection module 510 can choose a location determination technique other than GPS.

In some implementations, an application configuration component 518 can be used in selecting at least one location determination technique. For example, the application configuration component 518 can identify a characteristic of the application(s) 502 to the selection module 510. The Core Location service 508 can select any or all of the location determination techniques that is associated with the identified characteristic. For example, if the location request originates from the application 502A which is a mapping application that should use the exact location of the device, the selection module 510 can choose a location determination technique that determines the location relatively precisely. As another example, if the location request originates from the application 502B which needs the determined location within a specific deadline, the selection module 510 can choose a location determination technique that can produce a result by the deadline. One or more other application characteristics can be taken into account in some implementations.

In some implementations, a priority component 520 can be used in selecting at least one location determination technique. For example, the priority component 520 can identify a priority order between multiple location determination techniques to the selection module 510. The selection module can select the location determination technique(s) with the highest priority. For example, if GPS navigation has the highest priority, the selection module 510 can select GPS as the location determination technique, assuming that GPS is available in the device.

In some implementations, an accuracy component 522 can be used in selecting at least one location determination technique. For example, the accuracy component 522 can the accuracy of each available location determination technique. In some implementations, this value can be updated from time to time based on an actual accuracy established in connection with a location determination. For example, the selection module can select any or all of the currently available location determination techniques that has the highest accuracy.

In some implementations, a cost component 524 can be used in selecting at least one location determination technique. For example, the cost component 524 can identify a cost for each of several location determination techniques, such as a monetary cost, an amount of power consumed, and/or an amount of time required. The selection module 510 can select any or all of the location determination techniques that is associated with an acceptable cost.

The above examples illustrate that the service 508 can aggregate multiple location determination techniques. For example, the service 508 can determine relevant characteristics about the device, the requesting application and/or the available technique(s) to facilitate making a selection. The location determination can then be performed using the selected one of the multiple location techniques aggregated in the mobile device. Thus, the service 508 can be considered as providing an aggregator 526 that aggregates multiple location determination techniques. The aggregator 526 can be implemented in software, hardware and/or firmware, including any combinations thereof.

The above examples illustrate that the service 508 can disseminate information regarding location determination. For example, the service 508 can act as a server 528 relative to one or more of the applications 502. For example, the server 528 can serve useful information relating to location determination to any of the applications 502 for use in their operations. The server 528 can be implemented in software, hardware and/or firmware, including any combinations thereof.

The framework layer 500B can include a Core Location framework component 530. In some implementations, the component 530 can be a client library to which one or more applications in the applications layer 500A can bind. For example, the client library can provide a user-friendly location API and can handle communication with the service 508. Thus, in some implementations, the client library can be useful to a developer who is creating an application to work with the Core Location service 508.

The Core Location service 508 can include a daemon directed toward location service(s). In some implementations, the daemon is a system service that performs substantial operations of aggregating different position technologies and other related functions. For example, the Core Location framework component 530 can use inter-process communications techniques to exchange messages with the service 508.

In some implementations, load balancing can be performed. For example, a load of processing and/or calculations can be shared or otherwise balanced between the mobile device 202b and the network 210. As another example, load balancing can be performed between the mobile devices 202a and 202b. In some implementations, a portion of the determination is performed on the mobile device and a remainder of the determination is performed on another device, such as on the network 210. For example, the mobile device 202b can cause the network to perform the remainder of the determination. As another example, the network can cause the mobile device to perform the portion of the determination. The portion of the determination performed on the mobile device can for example include triangulating a number of detected transmitters (e.g., the access points 404 and/or the cell towers 406. In some implementations, this can be done using location information on the mobile device, such as a database, for example stored in a cache memory.

In some implementations, the mobile device can receive a result of performing the remainder of the determination from the other device, such as the network 210. For example, after the network 210 has performed the remainder of the determination, it can forward an information portion of the determined location to the mobile device. Such information can be used by the mobile device, for example by an application thereon that uses location information, in completing the determination of the mobile device's current location.

Load balancing can be performed with any or all available location determination techniques including, but not limited to, the techniques described with reference to FIG. 4. The service 508, or a part of it, can be used in the load balancing in some implementations.

The amount of load that is balanced can be selected dynamically. In some implementations, the mobile device can choose to hand over a certain amount of the processing necessary for a location determination based on some present characteristic. For example, one or more of the mobile device's processor capacity, available memory, current processing load, a deadline for determining the location, a need for accuracy in the determined location, and combinations thereof can be taken into account.

Figure 6:
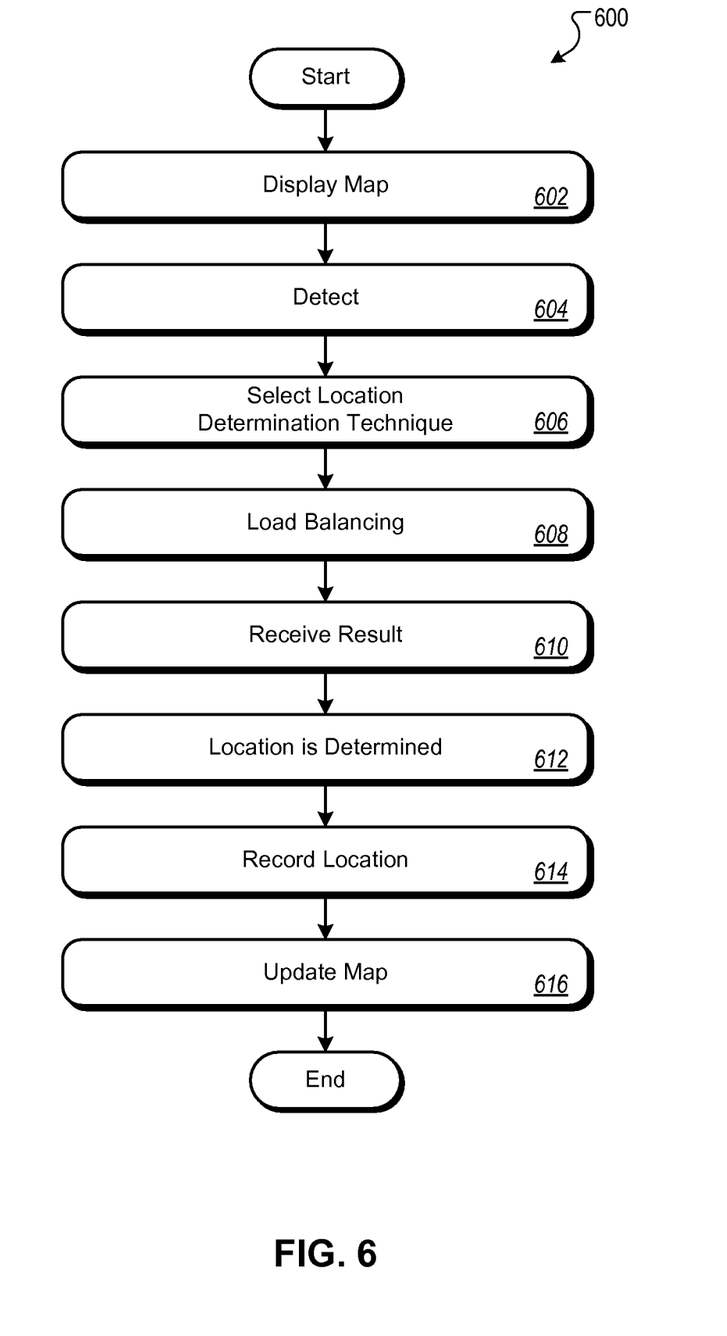
FIG. 6 shows an example of a method that can be performed to determine one or more locations.

FIG. 6 shows an example of a method 600 that can be performed to determine one or more locations. The method 600 can be performed by a processor executing instructions in a computer program product encoded on a tangible program carrier. For example, some or all of the method 600 can be performed in the mobile device 100.

In step 602, a map can be displayed. In some implementations, the map is configured to be updated or otherwise modified based on a present location of a mobile device. For example, a map can be presented on the display of the mobile device 100 after a user activates the maps object 144.

In step 604, it is detected that a location of a mobile device is to be determined. In some implementations, a user makes an input in the mobile device 100 to have the current location of the mobile device indicated on the map. For example, the mobile device can present a current location object on the display 102 and the user can activate this object to make the input.

In step 606, at least one among multiple location determination techniques is selected. In some implementations, the selection is based on a selection criterion. For example, selection criteria including, but not limited to, a state of the mobile device, a state of a requesting application, a state of the location determination technique(s), and combinations thereof, can be used.

In step 608, load balancing can be performed. For example, the mobile device 100 can cause some or all of the location determination to be performed elsewhere than on the mobile device, such as on a network or on another device.

In step 610, a result can be received. In some implementation, a result can be received from a network or another device that performed some processing or calculation(s) as part of load balancing. For example, the network 210 may have performed some part of the location determination and can forward a corresponding result to the mobile device.

In step 612, a location is determined. In some implementations, the Core Location service 508 causes the location to be determined by one or more selected location determination techniques. For example, the determined location can be provided to at least one applications identified as needing the determined location. In some implementations, the selected location determining technique is identified to at least one of the multiple applications identified in the detection, and the at least one application determines the location using the selected location determination technique.

In step 614, a location of the device can be recorded. In some implementations, the location is recorded at least momentarily by generating an output on a display that indicates the location.

In step 616, a map can be updated. In some implementations, the map can be updated to reflect the determined location of the mobile device. For example, the map on the display 102 can be updated to indicate a point or area on the map where the mobile device has been determined to presently be located.

Some or all steps of the method 600 can be omitted in some implementations. In some implementations, one or more additional steps can be performed. One or more steps can be repeated, performed earlier or later, and/or performed in a different order, to name just a few examples.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   determining an amount of power available to a mobile device, wherein the mobile device is configured to implement operations to determine a location of the mobile device based, in part, on the amount of power available to the mobile device, the operations to determine the location including receiving a first location of the mobile device based, in part, on a first amount of power available to the mobile device, and computing a second location of the mobile device based, in part, on a second amount of power available to the mobile device;
   comparing the determined amount of power with the first amount of power and the second amount of power; and
   selecting the first location received by the mobile device or the second location computed by the mobile device as the location of the mobile device based on a result of the comparing,
   where the method is performed by one or more computer processors of the mobile device.

2. The method of claim 1, wherein the selection is performed in a process on the mobile device that acts as a server for multiple applications on the mobile device.

3. The method of claim 2, further comprising:
   providing the location selected by the process to at least one of the multiple applications.

4. The method of claim 1, wherein the first location is determined using transmitter identifying information received in the mobile device from multiple transmitters, and locations of the multiple transmitters.

5. The method of claim 1, wherein the second location is computed using a satellite-based positioning system receiver of the mobile device.

6. A non-transitory program carrier storing instructions operable to cause a mobile device to perform operations comprising:
   determining an amount of power available to a mobile device, wherein the mobile device is configured to implement operations to determine a location of the mobile device based, in part, on the amount of power available to the mobile device, the operations to determine the location including receiving a first location of the mobile device based, in part, on a first amount of power available to the mobile device, and computing a second location of the mobile device based, in part, on a second amount of power available to the mobile device;
   comparing the determined amount of power with the first amount of power and the second amount of power; and
   selecting the first location received by the mobile device or the second location computed by the mobile device as the location of the mobile device based on a result of the comparing.

7. The non-transitory program carrier of claim 6, wherein the selection is performed in a process on the mobile device that acts as a server for multiple applications on the mobile device.

8. The non-transitory program carrier of claim 7, further comprising:
   providing the location selected by the process to at least one of the multiple applications.

9. The non-transitory program carrier of claim 6, wherein the first location is determined using transmitter identifying information received in the mobile device from multiple transmitters, and locations of the multiple transmitters.

10. The non-transitory program carrier of claim 6, wherein the second location is computed using a satellite-based positioning system receiver of the mobile device.

11. A mobile device comprising:
one or more computer processors; and
a program carrier storing instructions executable by the one or more processors to perform operations comprising:
   determining an amount of power available to a mobile device, wherein the mobile device is configured to implement operations to determine a location of the mobile device based, in part, on the amount of power available to the mobile device, the operations to determine the location including receiving a first location of the mobile device based, in part, on a first amount of power available to the mobile device, and computing a second location of the mobile device based, in part, on a second amount of power available to the mobile device;
comparing the determined amount of power with the first amount of power and the second amount of power; and
selecting the first location received by the mobile device or the second location computed by the mobile device as the location of the mobile device based on a result of the comparing.

12. The system of claim 11, wherein the selection is performed in a process on the mobile device that acts as a server for multiple applications on the mobile device.

13. The system of claim 12, further comprising:
providing the location selected by the process to at least one of the multiple applications.

14. The system of claim 11, wherein the first location is determined using transmitter identifying information received in the mobile device from multiple transmitters, and locations of the multiple transmitters.

15. The system of claim 11, wherein the second location is computed using a satellite-based positioning system receiver of the mobile device.

* * * * *